United States Patent [19]

Hooper

[11] Patent Number: 5,148,879
[45] Date of Patent: Sep. 22, 1992

[54] SPINDLE CAP BEARING FOR ROTARY CONE ROCK BITS

[75] Inventor: Michael E. Hooper, Spring, Tex.

[73] Assignee: Smith International, Inc., Houston, Tex.

[21] Appl. No.: 716,586

[22] Filed: Jun. 17, 1992

[51] Int. Cl.⁵ .......................................... E21B 10/22
[52] U.S. Cl. ................................... 175/371; 175/359
[58] Field of Search ................. 175/371, 372, 359, 95

[56] References Cited

U.S. PATENT DOCUMENTS

| | | | |
|---|---|---|---|
| 1,865,706 | 7/1932 | Reed | 175/371 X |
| 3,720,274 | 3/1973 | McCallum | 175/372 |
| 4,270,812 | 6/1981 | Thomas | 175/371 X |
| 4,641,976 | 2/1987 | Kar | 175/371 X |
| 4,825,964 | 5/1989 | Rives | 175/371 |
| 4,875,532 | 10/1989 | Langford, Jr. | 175/371 |
| 4,934,467 | 6/1990 | Langford, Jr. | 175/371 |

*Primary Examiner*—Thuy M. Bui
*Attorney, Agent, or Firm*—Robert G. Upton

[57] ABSTRACT

This invention consists of a floating spindle cap disposed between a spindle pilot bearing extending from a main journal bearing and a cone bore formed by a rotary rock bit cone secured to the journal bearing. The floating spindle cap is formed from a softer material than both the spindle bearing and the cone to accommodate for slight misalignments and edge loading between the journal bearings and the cone while working in a borehole.

6 Claims, 2 Drawing Sheets

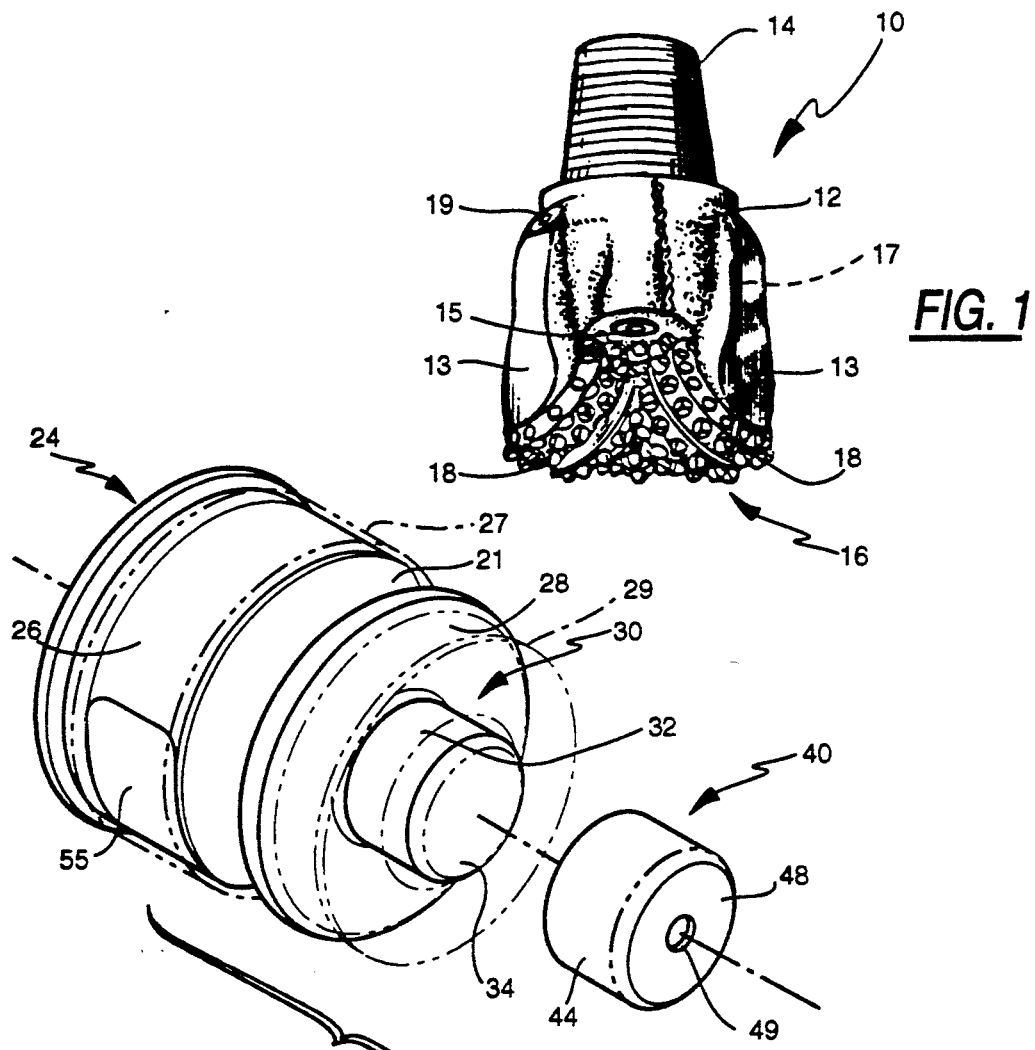
*FIG. 1*
*FIG. 3*
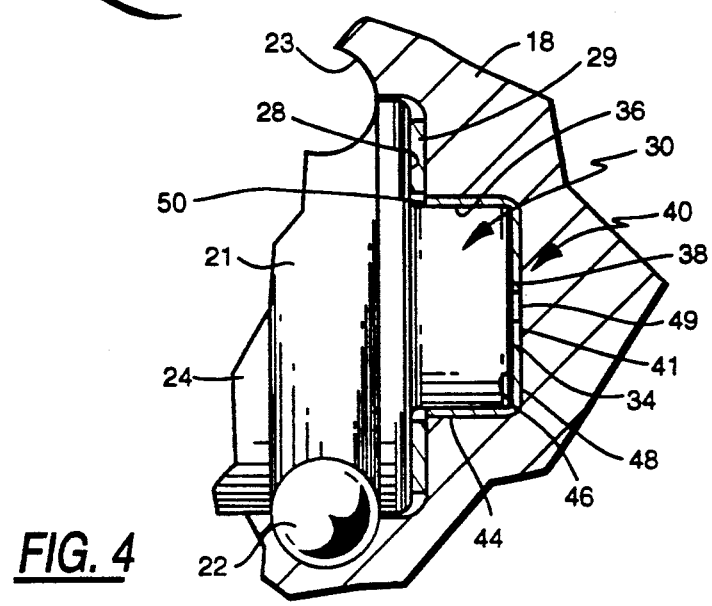
*FIG. 4*

/ 5,148,879 /

SPINDLE CAP BEARING FOR ROTARY CONE ROCK BITS

BACKGROUND OF THE INVENTION

I. Field of the Invention

This invention relates to bearings for rotary cone rock bits. More particularly, this invention relates to spindle bearings for sealed bearing rotary cone rock bits.

II. Description of the Prior Art

It is common practice to hardface the spindle or pilot bearing on both its axial and thrust surfaces. The pilot bearing extends from the main journal bearing supporting the rotary cone rotatively retained thereon. Typically, the spindle is subsequently ground or turned to finish geometry. The mating bore and thrust face formed in the cone are made from carburized steel, and are ground or turned to finish geometry after carburizing and quenching.

It is also state of the art to utilize only the thrust surface formed between the main journal bearing and the spindle, the end of the spindle bore in the cone being spaced from the spindle thrust face to prevent contact therebetween.

All of the foregoing prior art designs use a hard vs. hard material pair formed between the spindle and the cone bore resulting in a high friction coefficients between the bearing surfaces. This arrangement also does not conform easily to accommodate slight misalignments. This usually results in edge loading and high friction.

U.S. Pat. No. 4,270,812 assigned to the same assignee as the present invention, teaches a cylindrical bearing sleeve metallurgically bonded to a spindle bearing with a thrust disc bonded to the end of the pilot bearing. The bearing sleeve and disc would, however, suffer from edge loading and high friction as heretofore mentioned.

U.S. Pat. No. 4,875,532 describes a one piece radial and thrust bearing that is held by interference fit in the cone spindle bore. The thrust surface formed between the main bearing and the spindle is the primary bearing. This bearing is limited to a single wear surface and does not accommodate for possible misalignment nor does the bearing make use of the end thrust surface of the spindle bearing.

The spindle cap bearing of the present invention with its floating geometry teaches dual wear surfaces on the thrust and radial bearing surfaces and is more accommodating to misalignment due to its inherent flexibility. The relatively soft floating bearing deforms easily to reduce high stresses due to the aforementioned misalignment. Moreover, the floating member has a higher rotational speed capability than the existing prior art.

SUMMARY OF THE INVENTION

It is an object of the present invention to provide a floating spindle bearing cap having both axial and thrust bearing surfaces between the spindle and a cone bore formed in the adjacent rotary cone.

More particularly, it is an object of the present invention to provide a floating spindle bearing cap formed from a softer material than both the spindle bearing or cone to accommodate for slight misalignments between the spindle and cone.

A rotary cone rock bit consists of a rock bit body that forms a first pin end and a second cutting end. The second cutting end consists of at least one leg forming a main axial journal bearing cantilevered therefrom and having a first base end and a second end. A smaller axial spindle bearing is formed at the second end of the main bearing. The journal bearing further forms a first thrust bearing at the second end of the main bearing between the main bearing and the spindle bearing. The axial spindle bearing forms a thrust surface at the end of the spindle bearing.

A cylindrically shaped spindle cap forms a first open end and a second closed end. The spindle cap is adapted to be rotatively secured between the end of the spindle bearing and a cone bore formed by the cone. The spindle cap forms axial bearing surfaces inside and outside of the cylindrically shaped cap. The cap further forms inside and outside thrust bearing surfaces thereby. The rotatable spindle cap provides intermediate axial and thrust bearing surfaces between the spindle bearing and the cone base.

The spindle cap is additionally formed from softer material than the journal bearing, spindle bearing and cone.

The spindle cap also forms an aperture through its thrust surface to provide a means for lubricant to pass between the spindle bearing and adjacent cone thrust surface.

An advantage then of the present invention over the prior art is the floating spindle cap that provides intermediate inner and outer axial and thrust bearing surfaces.

Another advantage of the present invention over the prior art is the utilization of a less hard material in the fabrication of the floating spindle cap, the malleable cap accommodating for misalignment between the pilot bearing and the cone.

BRIEF DESCRIPTION OF THE DRAWINGS

FIG. 1 is a perspective view of a three cone rock bit;

FIG. 3 is an exploded view of a journal bearing illustrating the floating spindle cap, and FIG. 4 is a partially broken away cross-section of the spindle bearing, floating spindle cap and cone.

Figure 2:
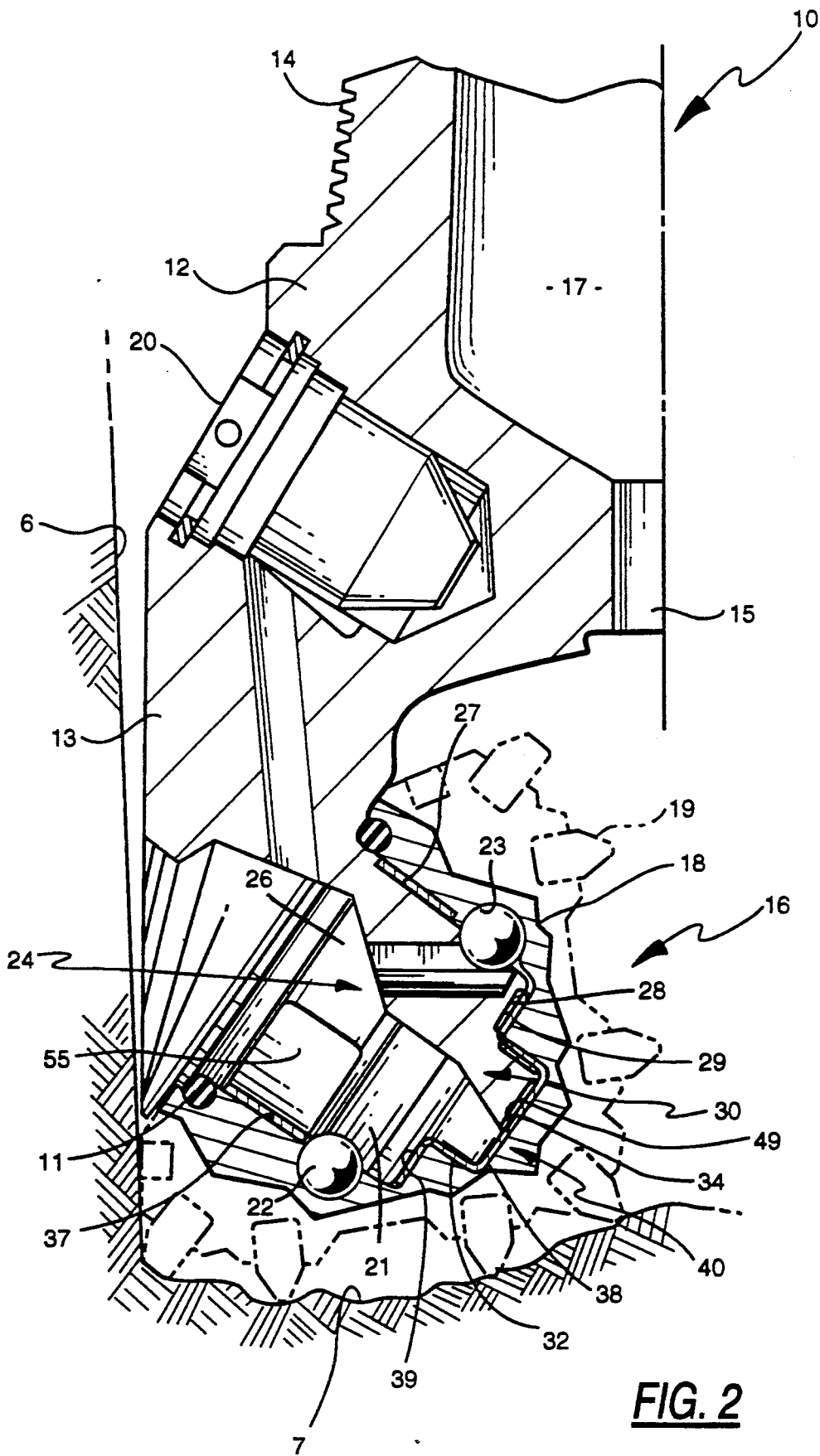
FIG. 2 is a cross-section of a leg of the rock bit illustrating the bearing configuration.

DESCRIPTION OF THE PREFERRED EMBODIMENTS AND BEST MODE FOR CARRYING OUT THE INVENTION

FIG. 1 illustrates a typical sealed bearing rotary cone rock bit generally designated as 10. The bit 10 consists of bit body 12, threaded pin end 14 and cutting end generally designated as 16. Each leg 13 supports a rotary cone 18 that is rotatively retained on a journal bearing 24 cantilevered from each of the legs. Each of the cones 18, for example, support a multiplicity of tungsten carbide inserts 19 extending from the surface of the cones. The rock bit 10 further includes a fluid passage through pin end 14 that communicates with a plenum chamber 17 formed by the bit body (not shown). Typically, one or more nozzles 15 are secured within the bit body 12. The nozzles direct fluid from the plenum chamber 17 towards a borehole bottom. The upper portion of each of the legs 13 may have a lubricant reservoir 20 to supply a lubricant to each of the rotary cones 18.

With reference now to the cross-section of FIG. 2, the leg 13 rotatively secures the cones 18 to a journal bearing 24 extending from the bottom of the leg. Each of the three legs of a three cone rock bit contains, for example, a lubricant reservoir 20 that directs lubricant through a lube hole formed in the leg toward the bearing surfaces formed between the cone 18 and the journal 24.

Typically, a lubricant seal 11 (o-ring) prevents the lubricant from escaping from the bearing surfaces.

The journal bearing generally designated as 24 consists of a bearing surface 26, the surface 26 may contain, for example, a hard metal inlay 55 on the load side or bottom side of the journal bearing 24. A ball bearing race 21 is formed in the journal bearing 24. A registering ball race 23 is formed in a cone bore formed in the cones 18. A multiplicity of balls 22 rotatively retain the cones 18 onto the journal bearing 24. A thrust surface 28 or "snoochy" is formed between the end of the main journal bearing 24 and a pilot or spindle bearing generally designated as 30. The spindle bearing extends from the thrust face 28, the spindle terminating in thrust face 34. The cone 18 also forms a spindle bore 36 which terminates in a thrust face 38 in the cone.

The main bearing, for example, may have a floating axial bearing 27 interposed between the axial bearing surface 24 and the journal bearing cone bore 37. In addition, a thrust washer 29 may float between the snoochy or thrust surface 28 and adjacent thrust surface 39 formed in the cone bore of the cone 18.

A floating spindle cap generally designated as 40 is adapted to float between the spindle 30 and the spindle bore 36 formed in the cone 18. The floating spindle cap may in addition have an aperture formed in the end thrust portion 41 to provide a lubricant path between the spindle 30 and the cone bore 36.

The spindle cap geometry is selected to enable an axial location of the diametral spindle bearing 30 so that the length of the spindle cap does not interfere with the radius between the axial spindle bearing and the thrust face 28 of the main bearing 24. This location is important because it prevents the cap 40 geometry from translating down to the relatively large spindle to snoochy radius formed in the main journal bearing 24. Of course the captive nature of the one piece floating cap positioned over the end of the spindle prevents the spindle cap from moving on the spindle bearing, at least in the axial direction.

The floating spindle cap is formed from, for example, a metal material of relatively low modules of elasticity so that it conforms to any misalignments which may occur between the cone, the journal bearing and spindle. The relatively soft material of the spindle cap, as opposed to the hard materials of the spindle and cone allow the bearing to conform to possible misalignments and reduces edge loading between the spindle 30 and the cone 18.

The unique floating spindle 40 possesses two opposing bearing surfaces 42 and 44 on the longitudinal axis and 46 and 48 on the radial thrust surfaces formed by the floating spindle cap 40. The two opposing bearing surfaces both on the diameter and the thrust face enables the floating cap to function even if one surface is damaged. The other cap surface is available to perform.

The spindle cap is preferably fabricated from a copper based spinodal alloy. This particular alloy consists essentially of a copper-nickel-tin mix. This bearing material is the subject of U.S. Pat. No. 4,641,976 entitled *Copper-Based Spinodal Alloy Bearings* and is assigned to the same Assignee as the present patent application. This patent is hereby incorporated by reference.

Referring now to the exploded view of FIG. 3, the journal bearing 24 is fabricated from a hard carburized steel which includes the bearing surface 26, the snoochy or thrust face 28 and the spindle or pilot bearing 30. A floating annular sleeve bearing 27 (shown in phantom) is placed between the surface 26 of the journal bearing 24 and the cone bore 37 of the cone 18. Snoochy thrust washer 29 (also shown in phantom) is disposed between snoochy face 28 and the cone bore thrust face 39 formed in cone 18.

The floating spindle cap 40 is rotatively retained between the spindle 30 and the spindle bore 36 in cone 18. In a specific example where the spindle diameter is 0.884 in., the i.d. of the spindle cap would be one to five thousands of an inch larger than the o.d. of the spindle 30. For example, if the i.d. of the spindle cap 40 is 0.887 in. and the thickness of the axial wall of the spindle cap is 0.03 in. thick, the o.d. then of the cap would be 0.947 in. and the i.d. of the cone spindle bore and the cone 18 would be 0.951 in. plus or minus 0.001 in. Generally speaking, the clearance between the i.d. of the spindle cap 40 and the o.d. of the spindle 30 may be between one and five thousands of an inch. The o.d. of the spindle cap 40 and the i.d. of the cone spindle bore 36 may be from two to six thousands in. clearance.

After assembly of rotary cone 18 onto the journal bearing 24, a clearance of about one thousands in. is generally provided between the end 34 of spindle 30 and the i.d. thrust surface 46 of cap 40. The o.d. 48 of the end of the spindle cap 40 and the thrust surface 38 formed in the cone 18 is about one thousands in. after assembly of the cone unto the journal bearing 24.

An aperture 39 may be formed in the spindle cap thrust surface 48 to provide a lubricant path between the end 34 of the spindle 30 and the thrust face 38 in cone 18.

Finally, with respect to FIG. 4, the partial cross-section illustrates the assembly of the cone 18 onto the journal bearing 24 with floating spindle cap 40 rotatively disposed between the cone bore 36 and the outside surface 32 of the spindle 30.

The end 50 adjacent the open end of the spindle cap 40 terminates above the radius formed between the spindle 30 and the snoochy thrust face 28. Thus, there can be no interference between the end 50 of the spindle cap and the radius between the spindle and the snoochy 28.

Referring again to the foregoing example, wherein the spindle diameter is about seven eights of an inch and the thickness of the malleable spindle cap 40 is about thirty thousands, the relatively soft flexible cap will allow for slight misalignments and edge loading during periods in which the rotary cone 10 is working in a borehole (6 and 7 of FIG. 2).

It would be obvious to use other materials besides spinodal alloys, so long as the material is flexible and relatively soft with respect to the carburized steel of the journal bearing and cone without departing from the scope of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A rotary cone rock bit comprising:
   a rock bit body forming a first pin end and a second cutting end, said second cutting end consisting of at least one leg forming a main axial journal bearing forming a first base end and a second end, a smaller axial spindle bearing formed at said second end of said main bearing, said axial spindle bearing forming a radial thrust surface at the end of the spindle bearing, and
   a cylindrically shaped spindle cap forming a first open end and a second closed end, said spindle cap being adapted to be rotatively secured between said end of said spindle bearing and a cone base formed by said cone, said spindle cap forming axial bearing surfaces inside and outside of said cylindrically shaped cap, said cap further forming inside and outside radial thrust bearing surfaces thereby, said rotatable spindle cap providing intermediate axial and thrust bearing surfaces between said spindle bearing and said cone.

2. The invention as set forth in claim 1 wherein said spindle cap is formed from a softer material than said journal bearing, spindle bearing and cone base.

3. The invention as set forth in claim 2 wherein said spindle cap is formed from an alloy of copper-nickel-tin.

4. The invention as set forth in claim 3 wherein said copper-nickel-tin alloy is spinodal alloy.

5. The invention as set forth in claim 4 wherein said radial thrust bearing surface of said spindle cap forms at least one aperture therethrough, said aperture serves to pass a lubricant between said spindle bearing and said cone.

6. The invention as set forth in claim 1 wherein said rotary cone rock bit is a sealed bearing three cone rock bit.

* * * * *